June 14, 1960 J. A. LAVALLEE 2,940,342
REAMERS
Filed Sept. 5, 1958 2 Sheets-Sheet 1

INVENTOR
JOSEPH AIMÉ LAVALLEE

BY Chapin & Neal

ATTORNEYS

June 14, 1960   J. A. LAVALLEE   2,940,342
REAMERS
Filed Sept. 5, 1958   2 Sheets-Sheet 2

INVENTOR
JOSEPH AIMÉ LAVALLEE

BY Chapin & Neal

ATTORNEYS

United States Patent Office 2,940,342
Patented June 14, 1960

2,940,342

REAMERS

Joseph Aimé Lavallee, Springfield, Mass., assignor to Lavallee & Ide, Inc., Chicopee, Mass., a corporation of New York Filed Sept. 5, 1958, Ser. No. 759,202

5 Claims. (Cl. 77—72)

The present invention relates to improvements in reamers.

The primary object of the invention is to overcome the deficiencies of conventional reamers insofar as wear or working life is concerned in producing bores of the smoothness and dimensional accuracy normally required of reamers.

Another object of the invention is to provide reamers fulfilling the above ends at a cost approximating or less than the cost of conventional reamers.

A further object of the invention is to minimize if not eliminate vibration in reamers so as to attain the above ends and also increase the speed at which they may be used.

Reamers of the present invention are characterized by blades having convexly curved trailing surfaces and convexly curved cutting edges at the outer or free ends of the blades. Preferably, as will be developed in detail hereinafter, both the trailing blade surfaces and the terminal or end cutting edges of the blades should be convexly curved for maximum blade strength and mass behind the cutting edges at the terminal ends of the blades which in turn minimizes, if not eliminates, vibration and chatter of the reamer in use. Thus minimizing the vibration leads to a reamer having a vastly improved wear life.

The above and other related objects and features of the invention will be apparent from a reading of the following description of the disclosure found in the accompanying drawings and the particular novelty thereof pointed out in the appended claims.

Figure 1:
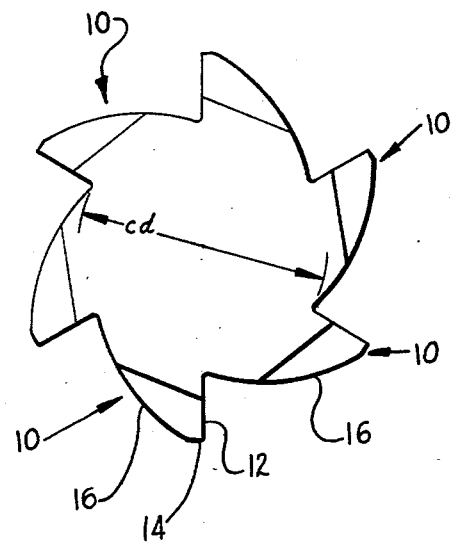
Fig. 1 is a plan view of the outer or cutting end of a reamer embodying the present invention.

As is well known all reamers comprise a plurality of cutting blades defined by longitudinal flutes and terminating in cutting edges at the outer end of the reamer. During use the reamer is gripped in a chuck or some sort of rotating means with the cutting edges of the flutes disposed at what will herein be referred to as the outer or free end of the reamer.

At this point note will be made that the present invention deals primarily with the formation of the blades of reamers and the cutting edges at the free ends thereof and thus in the drawings there is no showing of the shank portion of the reamer which may be circular, square or tapered depending on the manner in which it is to be used. In practice the advantages of the present invention will be more apparent in machine reamers, sometimes called chucking reamers, than in hand reamers.

As a final preliminary to the detailed description of the reamer seen in the drawings, confusion in terminology is believed best avoided by recognizing the definition of flutes to be those portions of a reamer which are cut away in forming the cutting blades.

The reamer illustrated in the drawings (Figs. 1 and 2 in particular) comprises six cutting blades 10 defined by flutes in the outer end portion of the reamer. The number of cutting blades and their angular spacing may be varied more or less according to conventional reamer design considerations. Further, the flutes may be either straight or helical although preference will usually be found for the more easily manufactured straight flutes in view of the improved characteristics of the present reamer.

As illustrated, each cutting blade 10 is identical and thus a detailed description of one blade will suffice. Reference will first be made to the plan or end view of Fig. 1 wherein it will be seen that the lower or near blade 10 comprises a longitudinal leading face 12 bounded along its outer edge (in a radial sense) by the leading edge of the reamer blade margin 14 and a trailing convex surface 16 extending from the trailing edge of the margin 14 to the inner edge of the leading face of the next successive blade 10, blending therewith by an appropriate small radius for preventing stress concentrations. The leading face 12 is formed generally radially of the axis of the reamer, however, as those familiar with the reamer art are aware, the leading face 12 may be offset and/or disposed for either positive or negative rake. The margin 14 is generated by a radius swung from the axis of the reamer and defines, for practical purposes, the diameter of a bore which would be reamed by the present reamer. The width of the margin is relatively small and, again, can be derived more or less from conventional reamer design experience since most all reamers today are provided with cutting blades having similar margins.

Figure 2:
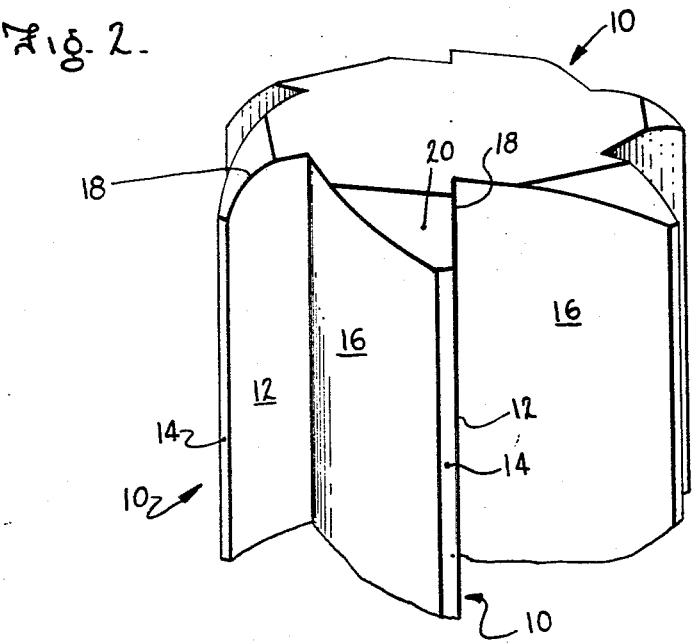
Fig. 2 is a perspective view of the outer end of the reamer seen in Fig. 1.

The convex trailing surface 16 is an important feature of the present invention in that this configuration, compared to conventional reamers, increases the beam strength of the cutting blade as well as at the same time increasing the mass of the blade, beam strength and mass being relative to the core diameter $cd$ (Fig. 1). It will also be noted that with the trailing surface 16 formed as herein taught, it is possible to increase the core diameter, as compared to the same size reamer of conventional design, and thereby increase the strength of the body of the reamer. The exact curvature of surface 16 is not critical except that it is preferable that a relatively short effective radius be employed in generating the surface 16 so as to provide the maximum possible amount of metal outside a straight line drawn from the trailing edge of the margin 14 to the inner edge of the leading surface 12 of the next succeeding blade 10, the provision of metal being limited primarily by the need to provide sufficient room in the flutes to accommodate chips when the reamer is in use.

It will also be noted that adjacent leading and trailing blade surfaces (12 and 16) may be simultaneously formed by a single pass of a tool in cutting each of the flutes. The blades 10 are thus readily formed with the only other operation being to form the margins 14 on a common radius from the axis of the reamer as above-described, which is preferably done before the flutes are formed.

Figure 4:
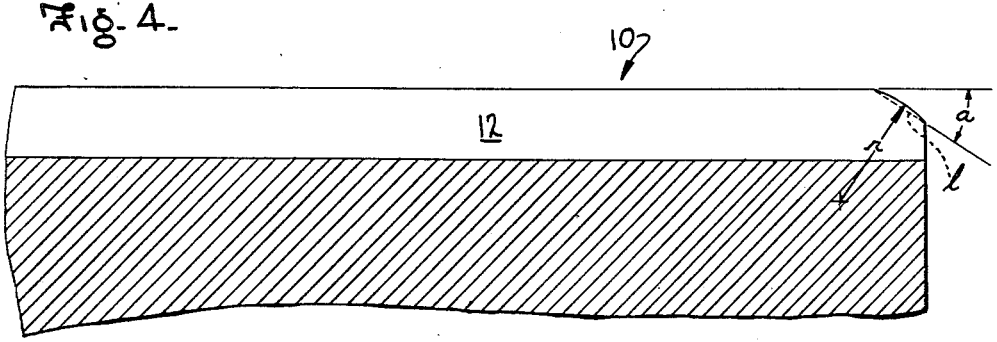
Fig. 4 is a section taken on line IV—IV in Fig. 3.

Referring now to the end cutting edges 18 (Figs. 2 and 4) at the free ends of the blades 10 it will be seen that these edges are also convexly curved, preferably about a relatively short radius $r$ seen in Fig. 4. Again the convex curve is not critical and may be formed by some compound radius such as in a parabolic curve or the like. The cutting edge 18 preferably should approach a tangential relation with the outer edge (in a radial sense) or longitudinal cutting edge of the leading blade surface 12 while the chordal line $l$ (Fig. 4) extending between the ends of the cutting edge 18 should lie at an angle *a* to an extension of the cutting edge, which angle is no more than 45°.

Figure 3:
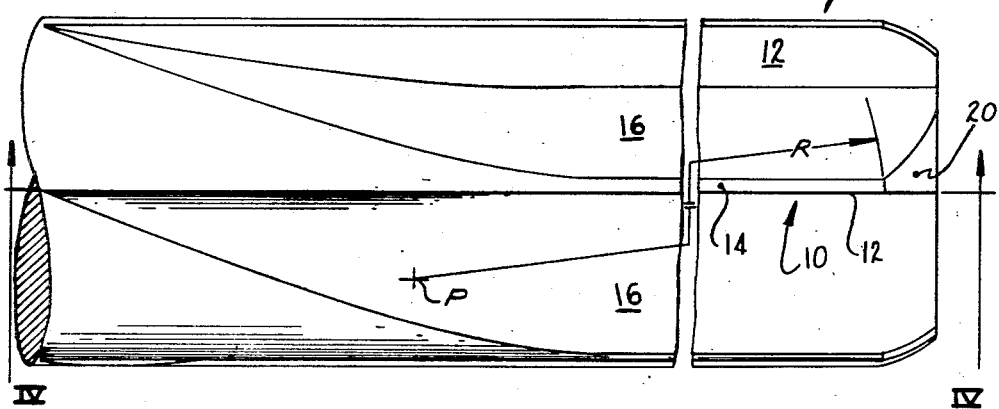
Fig. 3 is a side elevation of the fluted end of the same reamer.

It is necessary that the terminal cutting edges 18 be relieved for proper cutting action. The angle of relief from the cutting edge 18 should be in the order of 7° and the relieved free end of the cutting blade would be a fragmentary portion of a cylindrical surface if relieved along a straight path. However, it is preferable that these relieved end surfaces, indicated at 20 (Fig. 3 in particular) be formed about a second center of which is indicated at *p* and which is forwardly offset from the leading surface 12 on a line having an angle of about 7° from the curved cutting edge of the free end of the blade. That is, the surface 20 is generated by two curves, one generated by the radius *r* and the other generated by swinging the center of radius *r* about the center *p*, the latter radius being relatively long as indicated by the radius R in Fig. 3.

The curved surface 16 and relief 20 add a substantial mass of material behind the curved cutting edge 18 thereby increasing its strength as compared to the chamfered cutting edges of conventional reamers. Further the curved cutting edges and the additional mass of material provided by the described manner of forming the relieved surface 20 substantially reduces any tendency of the reamer to vibrate or chatter when in use thereby greatly increasing the wear or cutting life of the reamer.

It will also be noted that the convex configuration of the trailing blade surface 16 further increases the mass of metal behind the cutting edge 18 thereby combining with the increased mass of metal provided by the curved relief 20 to further minimize the tendency of the cutting edge 18 to vibrate as well as decreasing the likelihood of any vibration in the cutting blade as a whole. The substantial reduction in vibration and chatter thus attained greatly reduces the rate of wear as well as enhancing the bore smoothness which may be attained while at the same time higher production rates are permissible.

Having thus described the invention what is claimed as novel and desired to be secured by Letters Patent of the United States is:

1. A reamer having a shank end and an outer free end and having a plurality of circumferentially spaced longitudinally extending blades terminating at said free end, each blade comprising a generally radially disposed leading face terminating radially outwardly in a longitudinal cutting edge on a given radius from the axis of the reamer and a trailing surface which is convexly curved from said given radius towards the inner edge of the leading face of the next succeeding blade, said leading face having a convexly curved end cutting edge extending radially inwardly from said longitudinal cutting edge, the free end face of said blade being convexly curved and relieved from said end cutting edge with the trailing edge of the free end face being bounded by the convexly curved trailing surface of the blade.

2. A reamer having a shank end and an outer free end and having a plurality of longitudinally spaced blades defined by flutes formed in an integral metal cylinder, each blade having a generally radially disposed leading face terminating outwardly in a longitudinal cutting edge with all such edges on a common radius from the axis of the reamer, each blade also having a relatively narrow longitudinal margin generated by said radius and bounded at its leading edge by said cutting edge, each blade further having a convex trailing surface connecting the trailing edge of said margin and the radially innermost edge of the next succeeding leading blade face, said leading face having a convexly curved end cutting edge formed about a relatively short effective radius and extending radially inwardly from said longitudinal cutting edge, the cord between the ends of said end cutting edge being at an angle of less than 45° to an extension of the longitudinal cutting edge and the free end face of said blade being convexly curved and relieved from said end cutting edge.

3. A reamer having circumferentially spaced longitudinal blades defined by flutes formed in an integral metal cylinder, each blade having a generally radially disposed flat leading face terminating outwardly in a longitudinal cutting edge parallel to the axis of the reamer with all such edges on a common radius from said axis, each blade also having a relatively narrow longitudinal margin generated by said radius and bounded at its leading edge by said cutting edge, each blade further having a convex trailing surface connecting the trailing edge of said margin and the radially innermost edge of the next succeeding leading blade face, said leading face having a convexly curved end cutting edge generated by a relatively short effective radius and extending inwardly from said longitudinal cutting edge, with the cord between the ends of the end cutting edge being disposed on an acute angle of less than 45° to an extension of the longitudinal cutting edge, the free end face of said blade being convexly curved and being radially relieved from said end cutting edge about a center spaced forwardly of the longitudinal cutting edge on a line having an angle approximating 7° with said end cutting edge, said relieved end face being generated by a relatively long effective radius from said center.

4. A reamer having a shank end and an outer free end and having a plurality of longitudinal blades terminating at said free end, each blade having a leading face disposed generally radially of the axis of the reamer and terminating outwardly in a longitudinal cutting edge, said leading face having a convexly curved end cutting edge extending radially inwardly from said longitudinal cutting edge, the free end face of said blade being convexly curved and relieved from said end cutting edge.

5. A reamer as in claim 6 wherein each convexly curved end cutting edge is generated by a relatively short effective radius with the chord between the ends of the end cutting edge disposed on an acute angle of less than 45° to an extension of the longitudinal cutting edge and wherein each relieved end face is further generated about a center spaced forwardly of the longitudinal cutting edge on a line having an angle approximating 7° with said end cutting edge, said relieved end face being generated by a relatively long effective radius from said center.

References Cited in the file of this patent

UNITED STATES PATENTS

| 2,383,688 | Seiter | Aug. 28, 1945 |

FOREIGN PATENTS

| 546,973 | Great Britain | Aug. 7, 1942 |